(12) United States Patent
Inoue

(10) Patent No.: US 10,168,837 B2
(45) Date of Patent: Jan. 1, 2019

(54) INFRARED LIGHT ADJUSTMENT METHOD AND POSITION DETECTION SYSTEM

(71) Applicant: NEC Display Solutions, Ltd., Tokyo (JP)

(72) Inventor: Kazuya Inoue, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 15/502,773

(22) PCT Filed: Oct. 20, 2014

(86) PCT No.: PCT/JP2014/077795
§ 371 (c)(1),
(2) Date: Feb. 8, 2017

(87) PCT Pub. No.: WO2016/063323
PCT Pub. Date: Apr. 28, 2016

(65) Prior Publication Data
US 2017/0235432 A1    Aug. 17, 2017

(51) Int. Cl.
*G06F 3/042* (2006.01)
*G03B 21/14* (2006.01)
(Continued)

(52) U.S. Cl.
CPC .......... *G06F 3/0425* (2013.01); *G03B 17/54* (2013.01); *G03B 21/145* (2013.01);
(Continued)

(58) Field of Classification Search
CPC .... G06F 3/0425; G06F 3/0421; G06F 3/0304; G06F 3/0418; G06F 3/0423; G03B 21/145; G03B 17/54
See application file for complete search history.

(56) References Cited

U.S. PATENT DOCUMENTS 8,890,851 B2    11/2014  Yoshida et al.
2010/0079385 A1*  4/2010  Holmgren ............. G06F 3/0418
345/173
(Continued)

FOREIGN PATENT DOCUMENTS

JP    2002-149328 A    5/2002
JP    2003-091358 A    3/2003
(Continued)

OTHER PUBLICATIONS

International Search Report (ISR) (PCT Form PCT/ISA/210), in PCT/JP2014/077795, dated Dec. 2, 2014.
(Continued)

*Primary Examiner* — Tom Sheng
(74) *Attorney, Agent, or Firm* — McGinn IP Law Group, PLLC

(57) ABSTRACT

An adjustment method for adjusting the direction of infrared light projected so that infrared light to pass over a displayed image from a projection device that is rotatable with orthogonal first and second axes as axes of rotation, the method including: arranging the projection device such that the plane containing the first axis and a line perpendicular to the upper edge or lower edge of the displayed image is orthogonal to the plane in which the displayed image is displayed; displaying a first image representing a first target on the line; and rotating the projection device with the second axis as the axis of rotation such that the irradiation position of the infrared light upon an indicator in the first image, in which is displayed a captured image, coincides with the position of the first target on the first image.

15 Claims, 18 Drawing Sheets

(51) Int. Cl.
*G03B 17/54* (2006.01)
*G06F 3/041* (2006.01)

(52) U.S. Cl.
CPC .......... *G06F 3/0418* (2013.01); *G06F 3/0421* (2013.01); *G06F 3/0423* (2013.01)

(56) References Cited

U.S. PATENT DOCUMENTS

| | | | |
|---|---|---|---|
| 2011/0012867 A1* | 1/2011 | Lee ................. | G06F 3/0428 345/175 |
| 2011/0242054 A1* | 10/2011 | Tsu ................. | G06F 3/0425 345/175 |
| 2014/0313166 A1* | 10/2014 | Rattray ............. | H04N 9/3179 345/175 |
| 2016/0349918 A1* | 12/2016 | Dongre ............. | G06F 3/0418 |

FOREIGN PATENT DOCUMENTS

| | | |
|---|---|---|
| JP | 2011-237361 A | 11/2011 |
| JP | 2013-024579 A | 2/2013 |
| JP | 2014-132435 A | 7/2014 |
| JP | 2014-149740 A | 8/2014 |
| JP | 2014-167498 A | 9/2014 |
| WO | WO 2013/104061 A1 | 7/2013 |

OTHER PUBLICATIONS

Japanese Office Action dated Oct. 30, 2018, in Japanese Patent Application No. 2018-003606 with an English translation.

\* cited by examiner

INFRARED LIGHT ADJUSTMENT METHOD AND POSITION DETECTION SYSTEM

TECHNICAL FIELD

The present invention relates to an infrared light adjustment method and a position detection system, and for example, relates to an adjustment method and position detection system for adjusting the direction of infrared light that is used for detecting the position of an indicator that indicates a portion of a displayed image.

BACKGROUND ART

There are many examples of the introduction of electronic blackboard systems, such as for the purposes of adopting IT (Information Technology) in the classroom or raising efficiency in business conferences.

Patent Document 1 discloses a projector system that can be used as an electronic blackboard system.

The projector system described in Patent Document 1 includes a projector, an electronic stylus, and a stylus manipulation detection means. The electronic stylus is used to indicate a portion of an image (hereinbelow referred to as a "displayed image") that the projector has displayed on a projection surface such as a wall and to add characters or pictures to a portion of the displayed image. The electronic stylus supplies a signal such as an infrared ray that accords with jotting manipulation. The stylus-tip manipulation detection means detects the signal that is supplied from the electronic stylus with respect to a portion of the displayed image that was indicated by the electronic stylus. The projector adds characters or pictures that accord with the detection result of the pen-tip manipulation detection means to the portion of the displayed image that was indicated by the electronic stylus.

LITERATURE OF THE PRIOR ART

Patent Documents

Patent Document 1: Japanese Unexamined Patent Application Publication No. 2014-167498

SUMMARY OF THE INVENTION

Problem to be Solved by the Invention

In the projector system described in Patent Document 1, an electronic stylus was used to indicate a portion of a displayed image and to add characters or pictures. As a result, when the electronic stylus malfunctions, the projector system becomes unable to recognize the portion of the displayed image that is indicated by the electronic stylus.

A method is therefore desired that enables recognition, on the system side, that a portion of a displayed image has been indicated even in a case of using, for example, an indicator such as the human hand or finger or a pointer instead of an electronic stylus.

As the technology for realizing this method, a technology can be considered in which infrared light is projected from a projection unit so as to pass over a projected image; in which an image is captured in a state in which the indicator that is pointing to a portion of the image on the displayed image is irradiated by the infrared light; and in which the position of the indicator on the displayed image is recognized on the basis of the captured image.

FIG. 1 shows an example of a projection unit that is used for realizing the above-described technology.

Projection unit 1 projects infrared light L1 such that infrared light L1 passes over displayed image 4.

FIG. 2 shows an example of projection unit 1. Projection unit 1 includes a plurality of laser light sources 1a that emit, for example, infrared light, and a plurality of cylindrical lenses (hereinbelow also referred to as "prisms") 1b that have a one-to-one correspondence with laser light sources 1a.

The plurality of laser light sources 1a are arranged in an arc. Each laser light source 1a supplies infrared light (laser light) toward the outside of the arc. Each cylindrical lens 1b reads the infrared light that is supplied from corresponding laser light source 1a in the direction of arrow B.

In order to recognize the position of the indicator on displayed image 4 by using the above-described technology, the plane that contains progression region L2 of infrared light L1 is preferably set parallel to displayed image 4 (display surface) such that infrared light L1 does not come into contact with displayed image 4 (the display surface).

FIG. 3 shows the state in which infrared light L1 comes into contact with projection surface 6 on which displayed image 4 is projected. In this case, infrared light L1 does not reach indicator 5 that is pointing to, of displayed image 4, portion 41 that is not covered by infrared light L1. As a result, indicator 5 cannot be detected. Displayed image 4 in the figure is given thickness for the sake of explanation. In addition, indicator 5 is, for example, a human hand or finger or a pointer. Indicator 5 is not limited to a human hand or finger or pointer and can be altered as appropriate.

FIG. 4 shows an example of a state in which the plane that contains progression region L2 is not parallel to projection surface 6. In the example shown in FIG. 4, irradiation location 5a is not close to portion 5b of indicator 5 that is pointing to displayed image 4 and is at a location separated from portion 5b. As a result, the portion of displayed image 4 that is indicated by indicator 5 and irradiation location 5a no longer correspond in the captured image that was generated by imaging unit 2 and the accuracy of position detection decreases. Imaging unit 2 uses light of a wavelength band that contains infrared light and visible light to capture displayed image 4 and generate a captured image.

In order to thus recognize the position of the indicator on the displayed image by using the technology described hereinabove, the plane that contains progression region L2 of infrared light L1 is preferably set parallel to displayed image 4.

However, infrared light is not visible to the human eye, and it is therefore difficult for the unaided human to set the plane that contains progression region L2 of infrared light L1 parallel to displayed image 4 (the display surface). The issue therefore arises of the need for a method of easily adjusting the setting of the plane that contains progression region L2 of infrared light L1 parallel to displayed image 4 (the display surface).

It is an object of the present invention to provide an infrared light adjustment method and position detection system that can solve the above-described problem.

Means for Solving the Problem

The infrared light adjustment method of the present invention is an infrared light adjustment method for adjusting the direction of infrared light that is projected so as to pass over a displayed image from a rotatable projection device that is rotatable with each of a first axis and a second axis that is orthogonal to the first axis as axes of rotation, the method including steps of: arranging the projection device such that the plane that contains the first axis and a line that is perpendicular to the upper edge or lower edge of the displayed image is orthogonal to the plane in which the displayed image is displayed;
displaying a first image that represents a first target on the line as the displayed image;
rotating the projection device with the second axis as the axis of rotation such that the position of irradiation of the infrared light upon the indicator in the displayed image, in which is represented a captured image that captures a state of the indicator that points to the first target being irradiated by the infrared light, coincides with the position of the first target in the displayed image;
displaying, as the displayed image in place of the first image, a second image that represents a second target at a location that is different from the line; and
rotating the projection device with the first axis as the axis of rotation such that the irradiation position of the infrared light upon the indicator in the displayed image, in which is represented a captured image that captures a state of the infrared light irradiating the indicator that points to the second target, coincides with the position of the second target in the displayed image.

The position detection system of the present invention includes:
a projection unit that is rotatable with each of a first axis and a second axis that is orthogonal to the first axis as the axes of rotation, that is arranged such that the plane that contains the first axis and a line that is perpendicular to the upper edge or lower edge of a displayed image is orthogonal to the plane in which the displayed image is displayed, and moreover, that projects infrared light so as to pass over the displayed image;
an imaging unit that captures an image of the state in which infrared light is irradiated upon an indicator that points to a portion of the displayed image to generate a captured image; and
a determination unit that determines the position of the indicator on the displayed image on the basis of the captured image.

Effect of the Invention

The present invention enables easy adjustment of setting a plane that contains the progression region of infrared light parallel to a displayed image.

BEST MODE FOR CARRYING OUT THE INVENTION

An exemplary embodiment of the present invention is next described with reference to the accompanying drawings.

Figure 1:
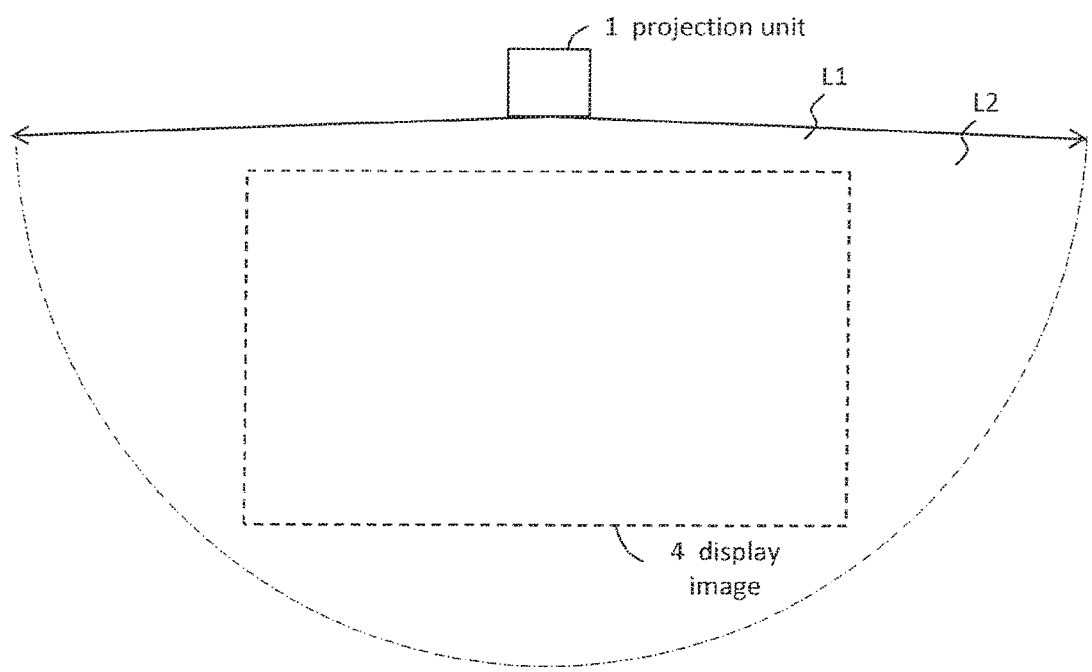
FIG. 1 shows progression region L2 of infrared light L1.
Figure 2:
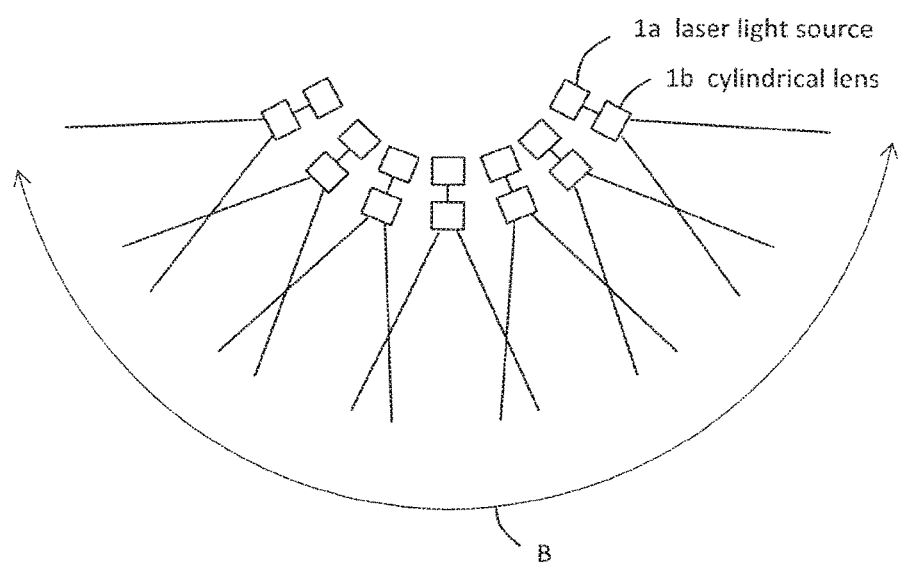
FIG. 2 shows an example of projection unit 1.
Figure 3:
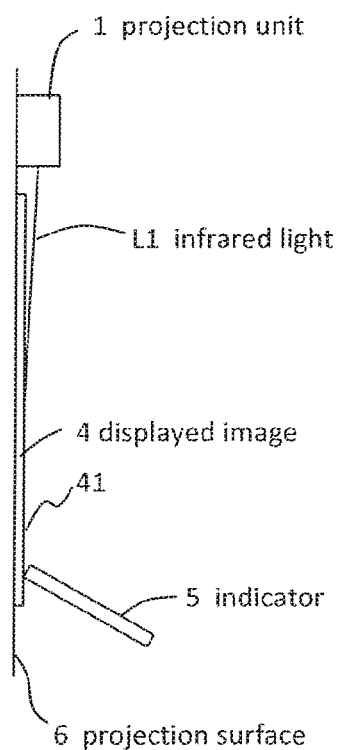
FIG. 3 shows the state in which infrared light L1 comes into contact with projection surface 6.
Figure 4:
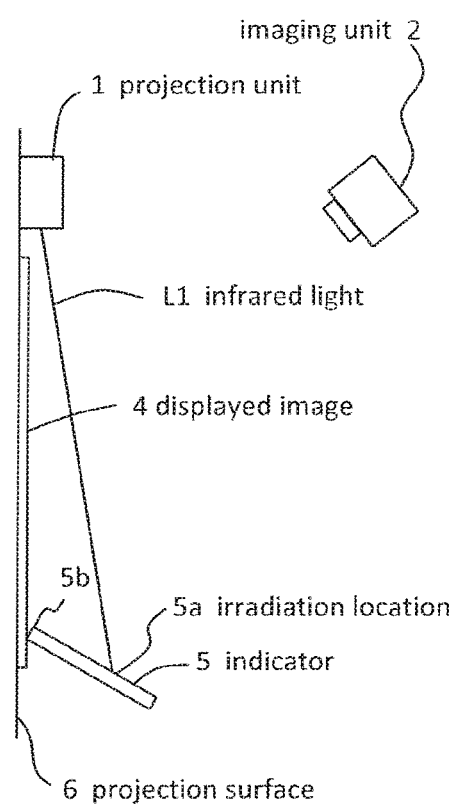
FIG. 4 shows an example of a state in which the plane that contains progression region L2 is not parallel to projection surface 6.
Figure 5:
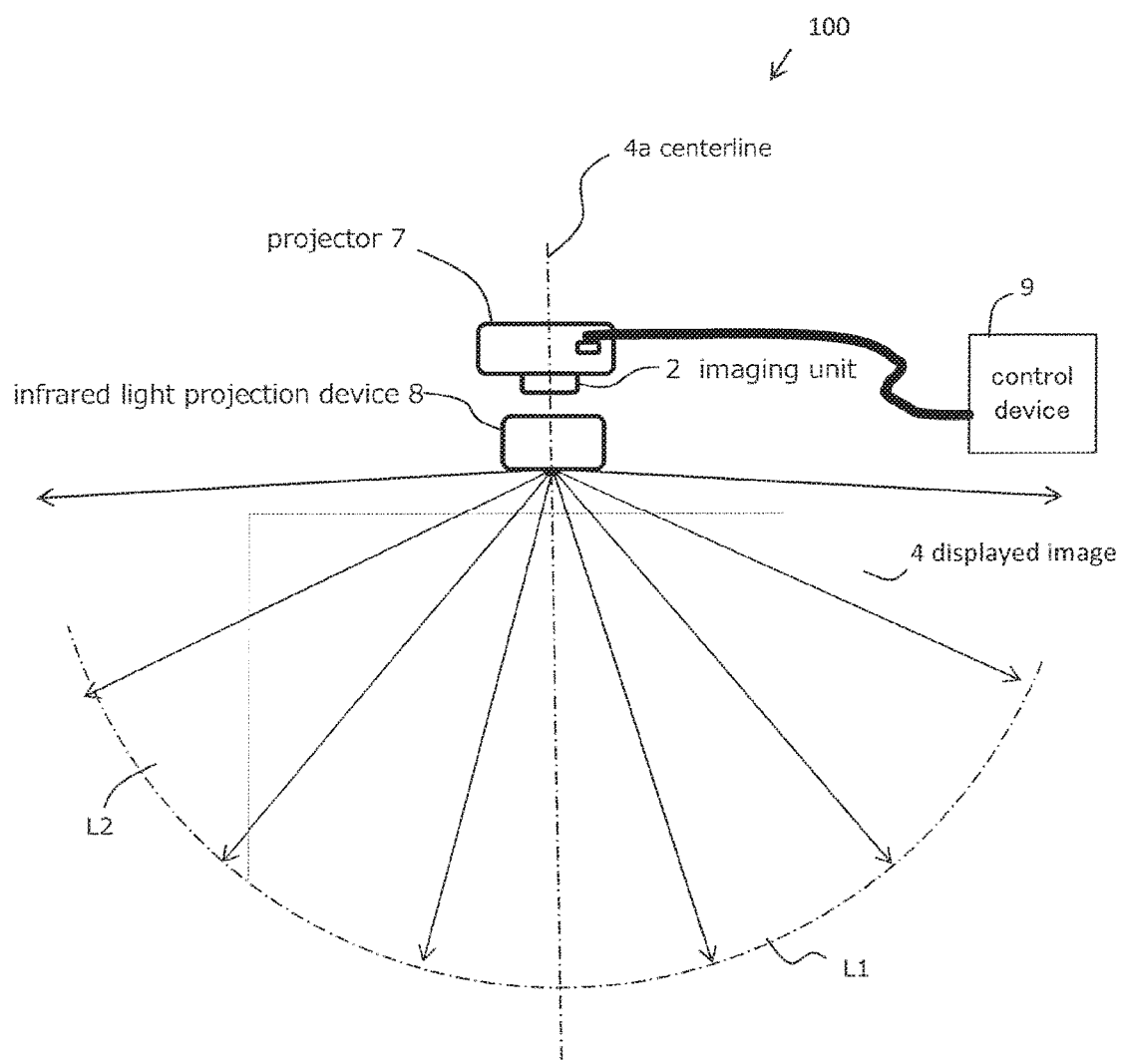
FIG. 5 shows projector system 200 of an exemplary embodiment of the present invention.
Figure 6:
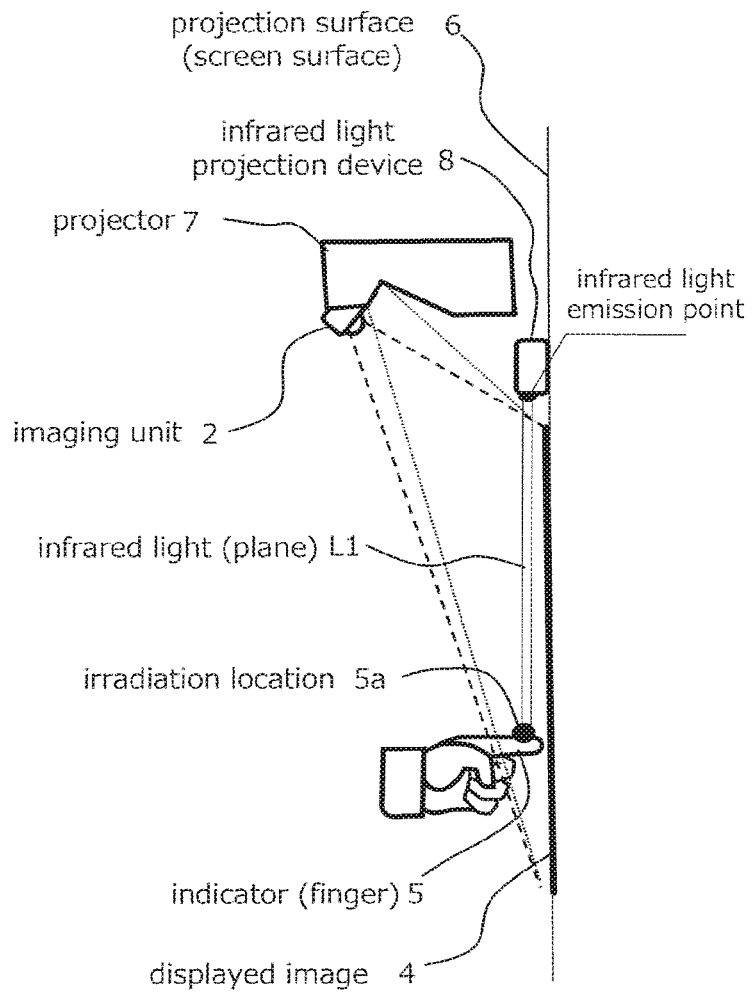
FIG. 6 is a schematic side view of projector system 100.

FIG. 5 shows projector system 100 in which the adjustment method of the exemplary embodiment of the present invention has been applied. FIG. 6 is a schematic side view of projector system 100 shown in FIG. 5. In FIGS. 5 and 6, the same reference numbers are given to components having the same configuration as shown in FIGS. 1-4.

Explanation is first presented regarding projector system 100 in which the adjustment method of an exemplary embodiment of the present invention has been applied.

Projector system 100 includes imaging unit 2, projector 7, infrared light projection device 8, and control device 9. Projector 7 displays on projection surface 6 displayed image 4 that accords with a picture signal received from control device 9. Infrared light projection device 8 is an example of a projection device and position detection auxiliary device. Infrared light projection device 8 projects infrared light L1.

Figure 7:
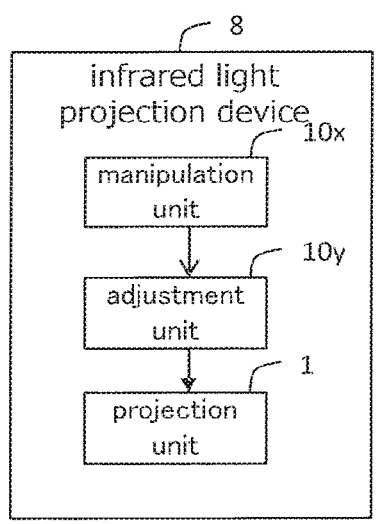
FIG. 7 shows an example of infrared light projection device 8.

FIG. 7 shows an example of infrared light projection device 8.

Infrared light projection device 8 includes projection unit 1, manipulation unit 10$x$, and adjustment unit 10$y$. The user manipulates manipulation unit 10$x$. Adjustment unit 10$y$ changes the orientation of projection unit 1 according to the manipulation of manipulation unit 10$x$.

In the present exemplary embodiment, the direction of infrared light L1 that is projected from projection unit 1 is adjusted by the manipulation of manipulation unit 10$x$.

Figure 8:
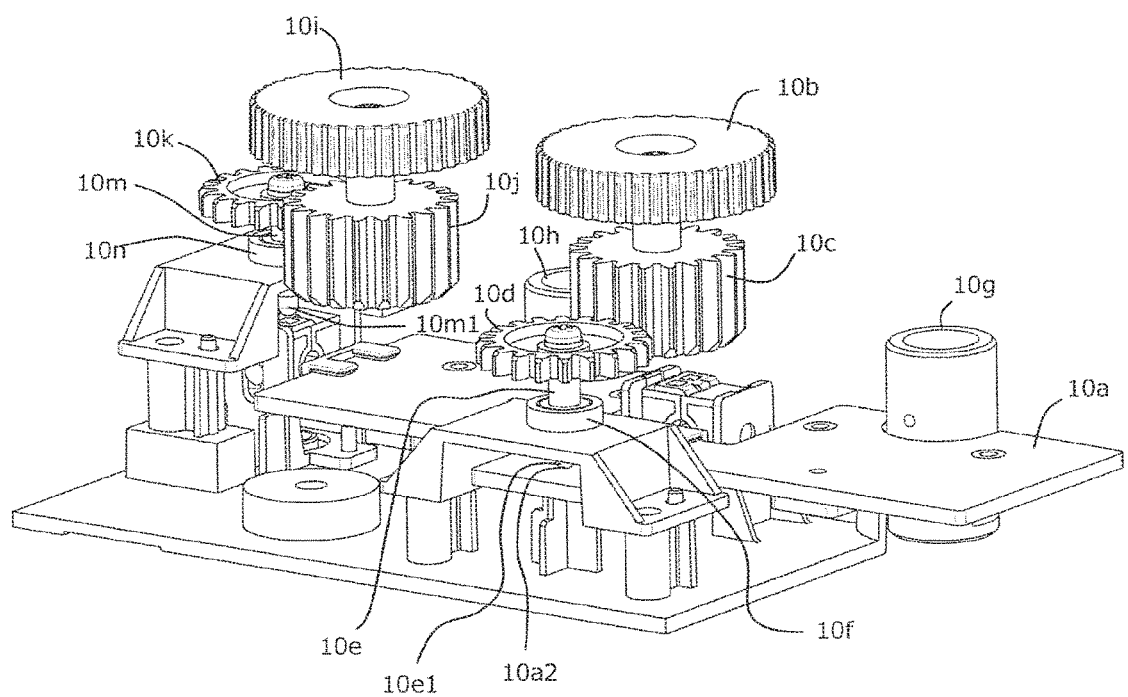
FIG. 8 shows an example of manipulation unit 10$x$ and adjustment unit 10$y$.
Figure 9:
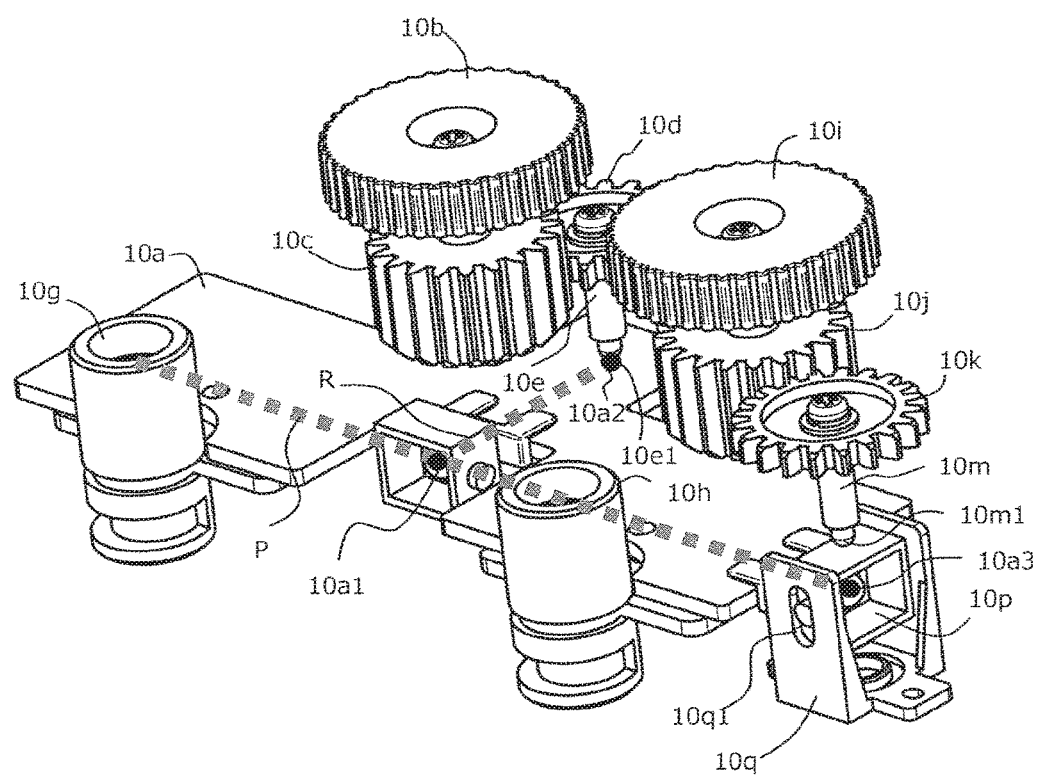
FIG. 9 shows an example of manipulation unit 10$x$ and adjustment unit 10$y$.

FIG. 8 shows an example of projection unit 1 and manipulation unit 10$x$ and adjustment unit 10$y$. FIG. 9 is a schematic view of the configuration shown in FIG. 8. In FIG. 9, support units 10$f$ and 10$n$ that are shown in FIG. 8 have been omitted for the purpose of simplifying the explanation.

Of the constituent elements shown in FIGS. 8 and 9, dials 10b and 10i are examples of the manipulation unit. Of the constituent elements shown in FIGS. 8 and 9, the portion that is made up constituent elements that differ from projection units 10g and 10h and dials 10b and 10i is an example of adjustment unit 10y. In addition, manipulation unit 10x and adjustment unit 10y are not limited to the configuration shown in FIG. 8 and can be altered as appropriate.

Substrate 10a can be moved with support point 10a1 (see FIG. 9) as a center.

Projection units 10g and 10h are each examples of projection unit 1. Projection units 10g and 10h each spread the light supplied from a laser light source by a prism and emit infrared light in fan-shaped form. The infrared light projected from each of projection units 10g and 10h covers the entire displayed image. The reason for providing two projection units such as projection units 10g and 10h is to ensure the intensity of the infrared light.

Axis R that passes through support point 10a1 and adjustment point 10a2 is hereinbelow referred to as "rolling axis R" (see FIG. 9). In addition, axis P that passes through support point 10a1 and that is orthogonal to rolling axis R is referred to as "pitching axis P" (see FIG. 9).

Projection units 10g and 10h are secured to the edge of substrate 10a that is on the opposite side from adjustment point 10a2 with respect to support point 10a1 such that progression region L2 of infrared light L1, rolling axis R, and pitching axis P all exist in the same plane. Projection units 10g and 10h project infrared light L1 in the direction opposite from substrate 10a.

Figure 10A:
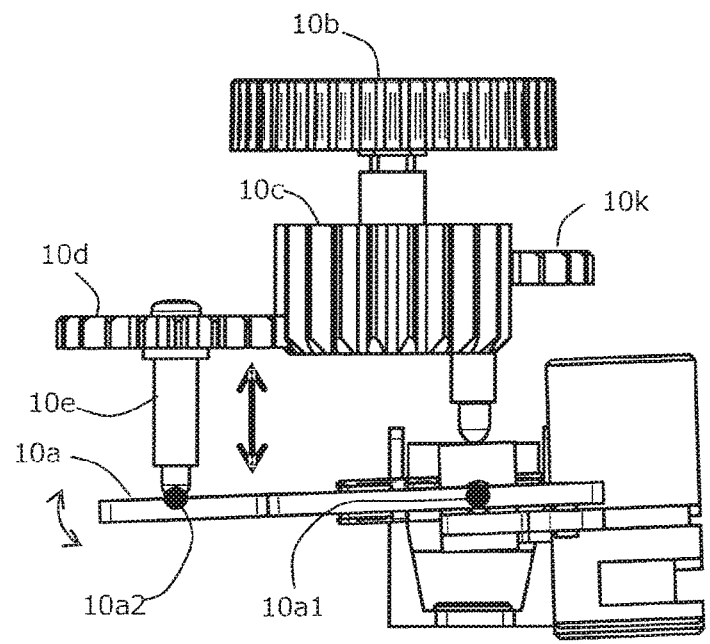
FIG. 10A is a view for describing the operation when dial 10$b$ is rotated.
Figure 10B:
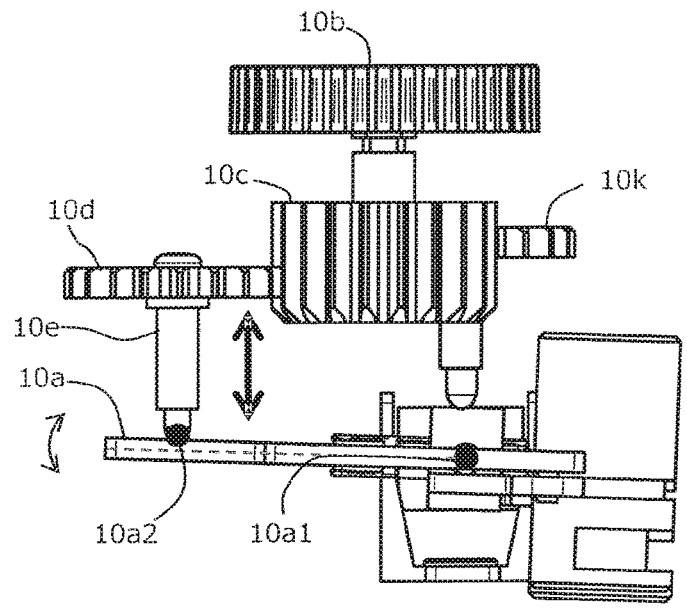
FIG. 10B is a view for describing the operation when dial 10$b$ is rotated.

FIGS. 10A and 10B are schematic views for describing the operation when dial 10b is rotated. In FIGS. 10A and 10B, support units 10f and 10n have been omitted in the interest of simplifying the explanation.

When dial 10b is turned, toothed wheel 10c that is fixed to dial 10b rotates. When toothed wheel 10c rotates, toothed wheel 10d and shaft 10e that is fixed to toothed wheel 10d also rotate. Male threading is provided on shaft 10e. The male threading on shaft 10e meshes with female threading of support unit (such as a nut) 10f (see FIG. 8). As a result, the positions of shaft 10e and toothed wheel 10d change in accordance with the direction of rotation of shaft 10e. With the movement of one end 10e1 of shaft 10e, rolling axis R rotates with pitching axis P that contains support point 10a1 as the center (see FIGS. 9 and 10A). Accordingly, rolling axis R rotates with pitching axis P as the center in accordance with the direction of rotation of dial 10b. The orientation of projection unit 1 that is secured to substrate 10a therefore changes.

Figure 11A:
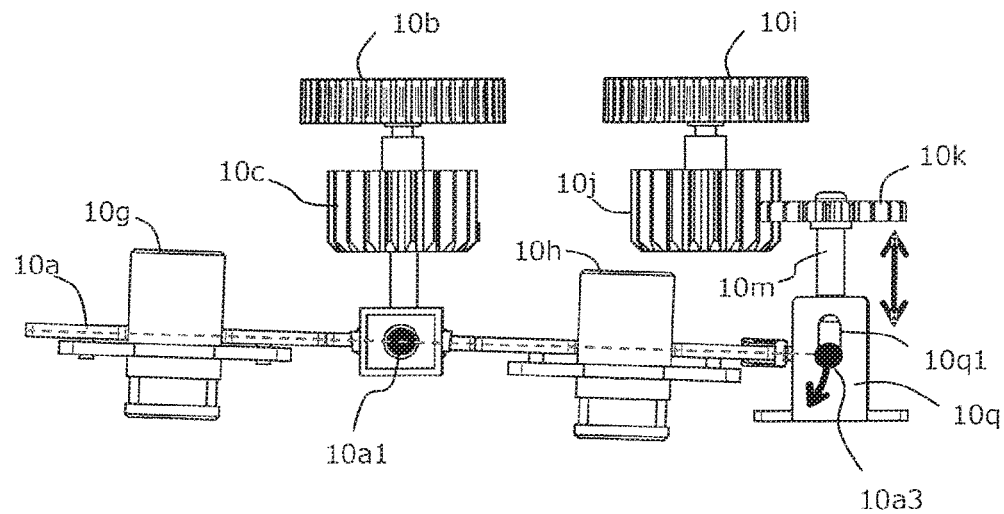
FIG. 11A is a view for describing the operation when dial 10B is rotated.
Figure 11B:
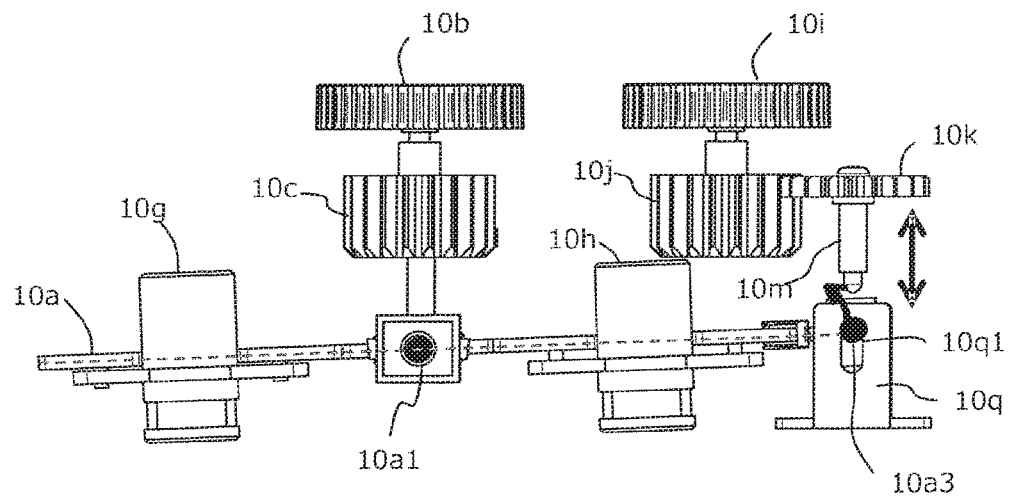
FIG. 11B is a view for describing the operation when dial 10$b$ is rotated.

FIGS. 11A and 11B are schematic views for describing the operation when dial 10i is turned. In FIGS. 11A and 11B, support units 10f and 10n are omitted in the interest of simplifying the explanation.

When dial 10i is turned, toothed wheel 10j that is secured to dial 10i rotates. When toothed wheel 10j rotates, toothed wheel 10k and shaft 10m that is secured to toothed wheel 10k also rotate. Male threading is provided on shaft 10m. The male threading of shaft 10m meshes with the female threading of support unit 10n that has a fixed position (see FIG. 8). The positions of shaft 10m and toothed wheel 10k therefore change according to the direction of rotation of shaft 10m. Support unit 10p that supports substrate 10a (see FIG. 9) therefore moves along guide groove 10q1 of guide unit 10q with the movement of one end 10m1 of shaft 10m. Accordingly, pitching axis P rotates with rolling axis R that contains support point 10a1 as the center in accordance with the direction of rotation of dial 10i. The orientation of projection unit 1 that is secured to substrate 10a therefore changes.

Control device 9 shown in FIG. 5 controls projector system 100. Control device 9 is, for example, a PC (Personal Computer). Control device 9 is not limited to a PC and can be altered as appropriate.

Figure 12:
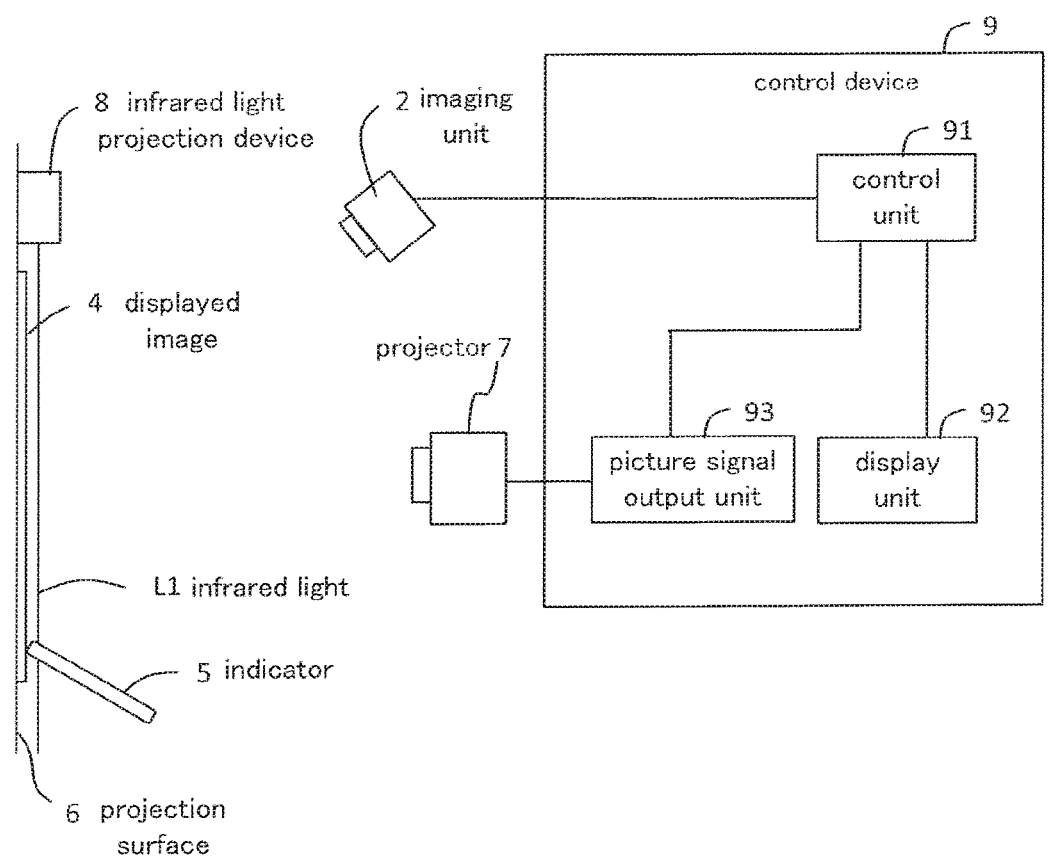
FIG. 12 shows an example of control device 9, imaging unit 2, projector 7, and infrared light projection device 8.

FIG. 12 shows imaging unit 2, projector 7, infrared light projection device 8, and an example of control device 9.

Control device 9 includes control unit 91, display unit 92, and picture signal output unit 93. Control unit 91 controls the operation of control device 9. For example, control unit 91 performs an operation that accords with the angle of divergence between displayed image 4 and the plane that contains progression region L2 of infrared light L1. Display unit 92 displays a variety of information. Picture signal output unit 93 supplies a picture signal to projector 7.

The adjustment operation in which the plane that contains progression region L2 of infrared light L1 is made parallel or substantially parallel to displayed image 4 (projection surface 6) is next described.

Picture signal output unit 93 of control device 9 first supplies a picture signal to projector 7. Projector 7, and upon receiving the picture signal, displays displayed image 4 that accords with the picture signal on projection surface (for example, a screen) 6.

Infrared light projection device 8 is next set such that, when viewed from a direction perpendicular to projection surface 6, rolling axis R (first axis) of adjustment unit 10y overlies centerline 4a of displayed image 4 (see FIG. 5). Centerline 4a is an example of the line that is perpendicular to the upper edge or lower edge of displayed image 4. In the present exemplary embodiment, centerline 4a passes through the center of displayed image 4. As a result, infrared light projection device 8 is arranged such that the plane that contains rolling axis R and centerline 4a of displayed image 4 is orthogonal to the plane in which displayed image 4 is displayed.

The user manipulates control device 9 to activate calibration software that has been installed in control device 9.

Control unit 91 activates calibration software in accordance with this manipulation. Control unit 91 executes the following process in accordance with the calibration software.

Control unit 91 supplies a picture signal for calibration from picture signal output unit 93 to projector 7. The picture signal for calibration indicates an image (hereinbelow referred to as a "calibration image") for causing coordinates, that have been set in an image that accords with a picture signal that is recognized by control unit 91, to correspond with coordinates in displayed image 4 that is displayed in captured image 2a.

Figure 13:
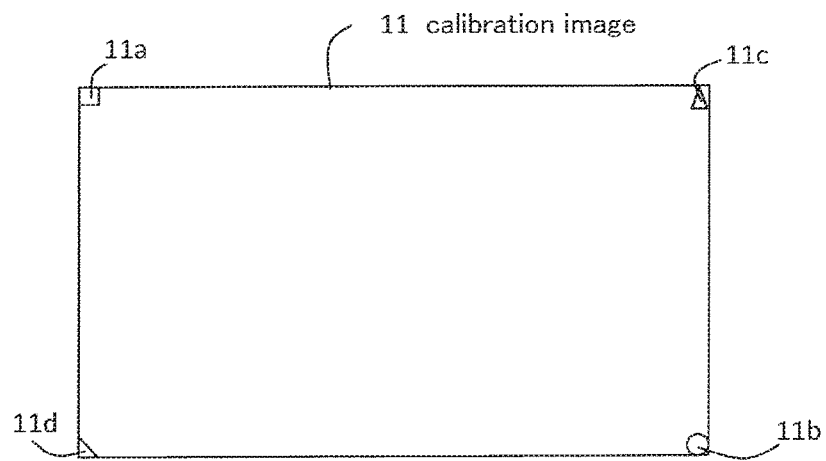
FIG. 13 shows an example of calibration image 11.

FIG. 13 shows an example of calibration image 11.

Calibration image 11 includes reference point 11a that indicates the upper left of displayed image 4, reference point 11b that indicates the lower right of displayed image 4, reference point 11c that indicates the upper right of displayed image 4, and reference point 11d that indicates the lower left of displayed image 4.

Next, imaging unit 2 captures calibration image 11 to generate captured image 2a1 that accords with calibration image 11.

Figure 14:
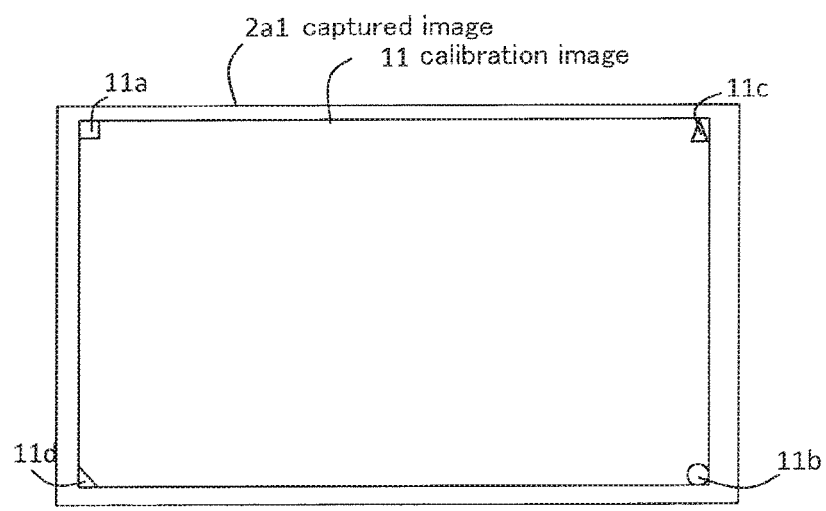
FIG. 14 shows an example of captured image 2$a$1.

FIG. 14 shows an example of captured image 2a1.

Imaging unit 2 supplies captured image 2a1 to control device 9.

Control unit 91 of control device 9 causes the coordinates of the position of reference point 11a shown in captured image 2a1 to correspond to the coordinates of the position of the upper left of displayed image 4. Control unit 91 further causes the coordinates of the position of reference point 11*b* shown in captured image 2*a*1 to correspond to the coordinates of the position of the lower right of displayed image 4. Control unit 91 further causes the coordinates of the position of reference point 11*c* indicated in captured image 2*a*1 to correspond to the coordinates of the position of the upper right of displayed image 4. Finally, control unit 91 causes the coordinates of the position of reference point 11*d* indicated in captured image 2*a*1 to correspond to the coordinates of the position of the lower left of displayed image 4. In this way, the coordinates in displayed image 4 represented by captured image 2*a* correspond to the coordinates in an image (an image that accords with a picture signal) that is recognized by control unit 91.

Infrared light projection device 8 projects infrared light L1 in a fan shape from outside the upper portion of displayed image 4 such that infrared light L1 passes over displayed image 4. At this time, the surface that forms progression region L2 of infrared light L1 is preferably parallel or substantially parallel to displayed image 4.

However, because infrared light L1 is not visible to the human eye, it is difficult for a person to visually set the plane that forms progression region L2 of infrared light L1 parallel to or substantially parallel to displayed image 4.

However, the present exemplary embodiment assists in the adjustment of setting the plane that forms progression region L2 of infrared light L1 parallel or substantially parallel to displayed image 4.

In the present exemplary embodiment, the inclination adjustment of progression region L2 that takes pitching axis P of infrared light projection device 8 as the axis of rotation is referred to as "pitching direction adjustment." The inclination adjustment of progression region L2 that takes rolling axis R of infrared light projection device 8 as the axis of rotation is referred to as the "rolling direction adjustment."

The orientation of the plane that forms progression region L2 (angle with respect to projection surface 6) is determined by the position of three points on the plane that forms progression region L2.

In the present exemplary embodiment, support point 10*a*1 is used as one point of these three points (refer to FIG. 9). Adjustment point 10*a*2 and adjustment point 10*a*3 are used as the remaining two points (refer to FIG. 9).

The position of adjustment point 10*a*2 can be adjusted by rotating dial 10*b*. The position of adjustment point 10*a*3 can be adjusted by rotating dial 10*i*.

Support point 10*a*1 and rolling axis R are positioned on the centerline of infrared light projection device 8. Pitching axis P is arranged so as to pass through support point 10*a*1 and be orthogonal to rolling axis R.

In the present exemplary embodiment, the angle of the plane that forms progression region L2 of infrared light L1 is adjusted by the user who manipulates (adjusting) dial 10*b* and dial 10*i* in the order of first manipulating dial 10*b* and then manipulating dial 10*i*.

Dial 10*b* corresponds to pitching direction adjustment. Rolling axis R rotates with pitching axis P as the axis of rotation according to rotation of dial 10*b*. As a result, the angle of rolling axis R is adjusted according to the rotation of dial 10*b*.

Dial 10*i* corresponds to rolling angle adjustment. Pitching axis P rotates with rolling axis R as the axis of rotation according to the rotation of dial 10*i*.

In the present exemplary embodiment, from among an adjustment operation that uses dial 10*b* and an adjustment operation that uses dial 10*i*, an adjustment operation that uses dial 10*b* is performed before an adjustment operation that uses dial 10*i*.

An adjustment operation that uses dial 10*b* is performed before an adjustment operation that uses dial 10*i* because the adjustment of the angle of the plane that forms progression region L2 is easier. This point is explained below.

If the pitching direction adjustment is completed first, rolling axis R is parallel to projection surface 6 (the screen).

The rolling direction adjustment is next implemented. In this case, pitching axis P is rotated with rolling axis R that is parallel to projection surface 6 as the axis of rotation.

As a result, the plane that forms progression region L2 of infrared light L1 can be set parallel to projection surface 6 (displayed image 4).

In order to complete the adjustment of the plane in which progression region L2 is formed in two steps, dial 10*b* and dial 10*i* are manipulated in the order of first manipulation dial 10*b* and then manipulating dial 10*i* as described hereinabove.

The adjustment operation that uses dial 10*b* and dial 10*i* is next described.

Figure 15:
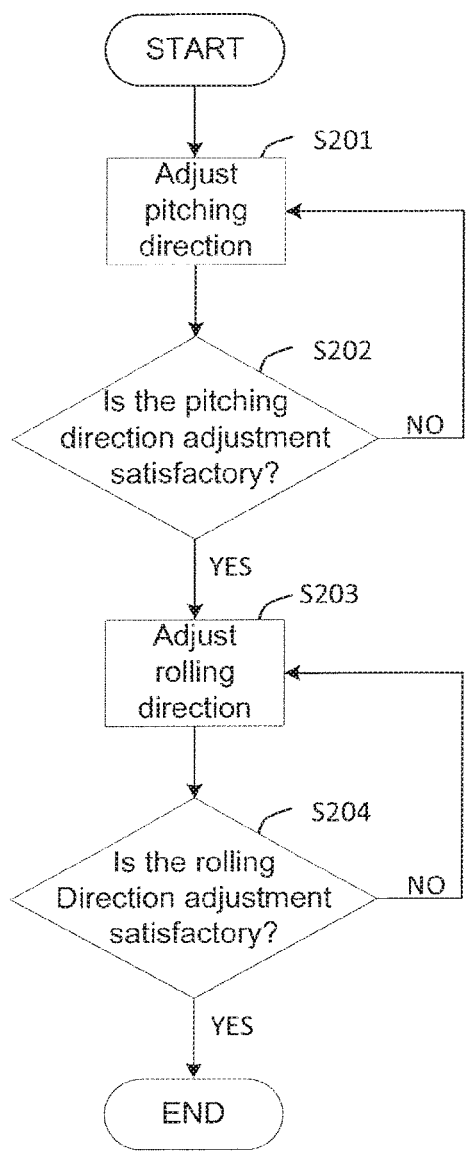
FIG. 15 is a view for describing an example of adjustment that uses dial 10$b$ and dial 10$i$.

FIG. 15 is a view for describing the adjustment operation that uses dial 10*b* and dial 10*i*. The pitching direction adjustment begins when control unit 91 receives an instruction to begin the adjustment process that uses dial 10*b* and dial 10*i* from an input unit (not shown) (Step S201).

In Step S201, control unit 91 supplies a picture signal for pitching direction adjustment from picture signal output unit 93 to projector 7. The picture signal for pitching direction adjustment represents a pitching adjustment image for performing the pitching direction adjustment.

Figure 16:
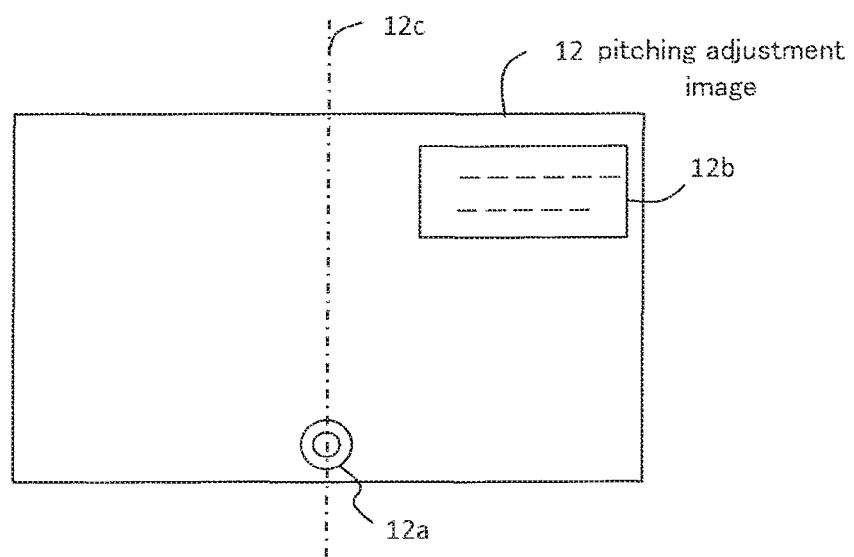
FIG. 16 shows an example of pitching adjustment image 12.

FIG. 16 shows an example of pitching adjustment image 12.

Pitching adjustment image 12 has target 12*a* that is an example of the first target and instruction 12*b*.

Target 12*a* is located in the lower portion of centerline 12*c* of pitching adjustment image 12. As a result, target 12*a* is located on centerline 12*c* in the vicinity of the side that is opposite to the side of infrared light projection device 8. In addition, centerline 12*c* is an example of the line that is perpendicular to the upper edge or lower edge of pitching adjustment image 12 that is an example of displayed image 4. In the present exemplary embodiment, centerline 12*c* passes through the center of pitching adjustment image 12.

Instruction 12*b* requires "Touch target 12*a* of the lower portion of the screen center with an indicator such as a finger (an obstruction)."

Upon receiving the picture signal for pitching direction adjustment, projector 7 displays pitching adjustment image 12 on projection surface 6 as displayed image 4.

The user places indicator 5 such as his or her finger in contact with target 12*a* in accordance with instruction 12*b* that is displayed in pitching adjustment image 12.

Figure 17A:
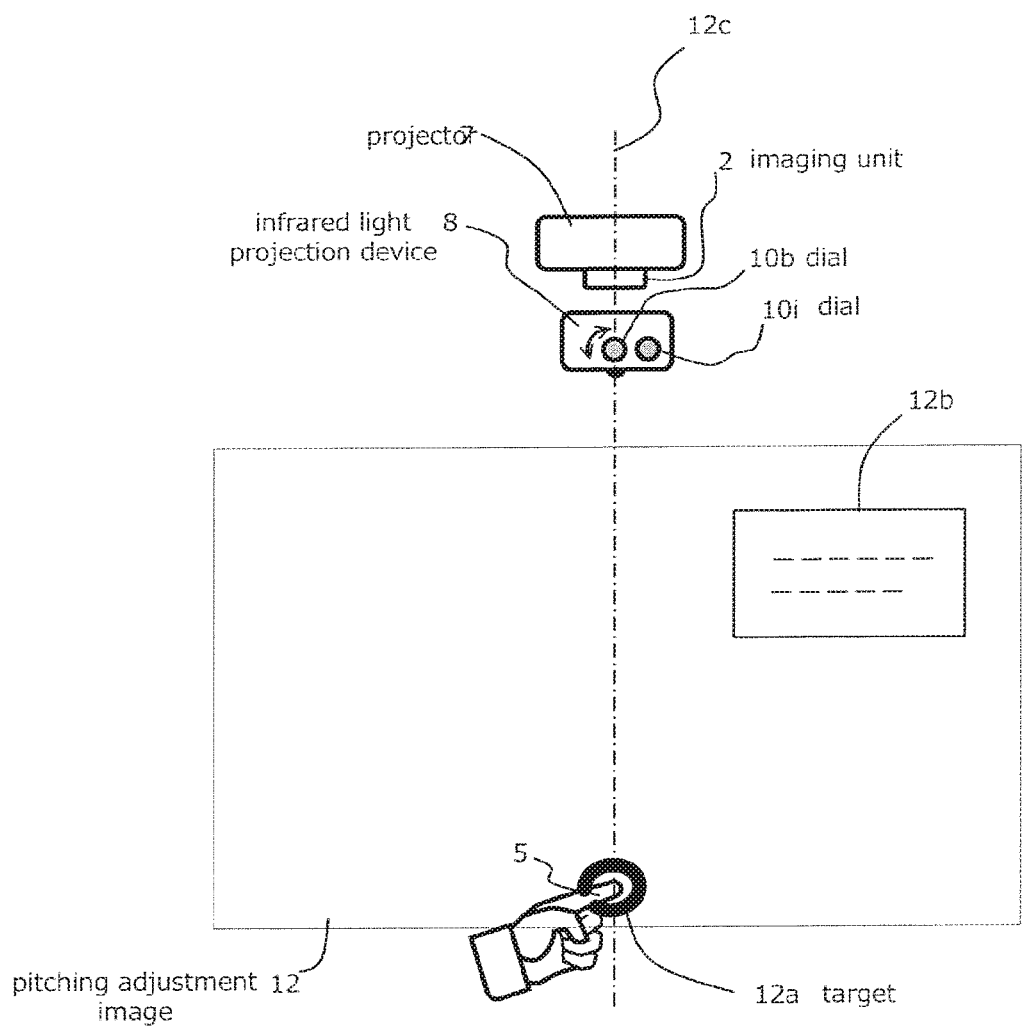
FIG. 17A shows an example of a state in which target 12$a$ is touched by indicator 5 such as a finger.

FIG. 17A shows an example of the state in which target 12*a* is being touched by indicator 5 such as a finger.

When target 12*a* is touched by indicator 5 such as a finger, infrared light L1 is irradiated and diffused upon indicator 5.

Imaging unit 2 captures an image of the state in which indicator 5, such as a finger, is in contact with target 12*a* to generate captured image 2*a*. In other words, imaging unit 2 captures an image of the diffused infrared light. Imaging unit 2 supplies captured image 2*a* to control unit 91.

Control unit 91 determines irradiation location 5*a* on displayed image 4, that is displayed in captured image 2*a*, as the position of indicator 5 on displayed image 4.

Control unit 91 next displays on display unit 92 the relation between the position of indicator 5 on displayed image 4 and the position of target 12a on pitching adjustment image 12 (displayed image 4) that is specified from the picture signal for pitching direction adjustment. For example, control unit 91 displays on display unit 92 the coordinates of the position of indicator 5 on displayed image 4 (hereinbelow referred to as the "detected coordinates") and the coordinates of the position of target 12a on pitching adjustment image 12 (hereinbelow referred to as "first target coordinates").

Figure 17B:
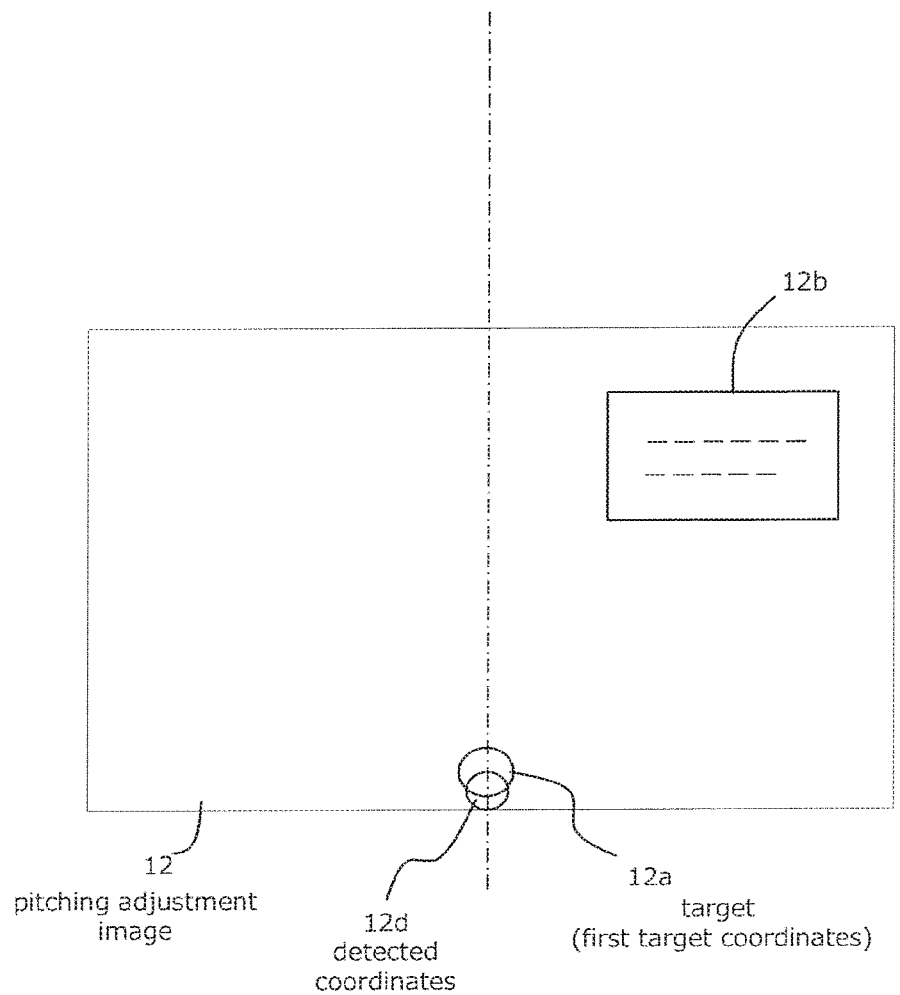
FIG. 17B shows an example of an image that shows the relation between the detection coordinates and the first target coordinates.

FIG. 17B shows an example of an image that represents the relation of the detected coordinates and the first target coordinates.

When the detected coordinates coincide with the first target coordinates, control unit 91 displays on display unit 92 first information that indicates matching of the coordinates (for example, the information "The detected coordinates have coincided with target 12a"). The display of the first information means that the pitching direction adjustment has been completed.

Until the first information is displayed, the user continues to touch target 12a with his or her finger and manipulate dial 10b while watching the detected coordinates and the first target coordinates that are displayed on display unit 92 to thus move and adjust the direction of infrared light L1 and cause the detected coordinates to coincide with the first target coordinates. When the detected coordinates coincide with the first target coordinates, control unit 91 displays the first information (for example, "The detected coordinates have coincided with the first target coordinates") on display unit 92 and the pitching direction adjustment is completed.

Figure 18:
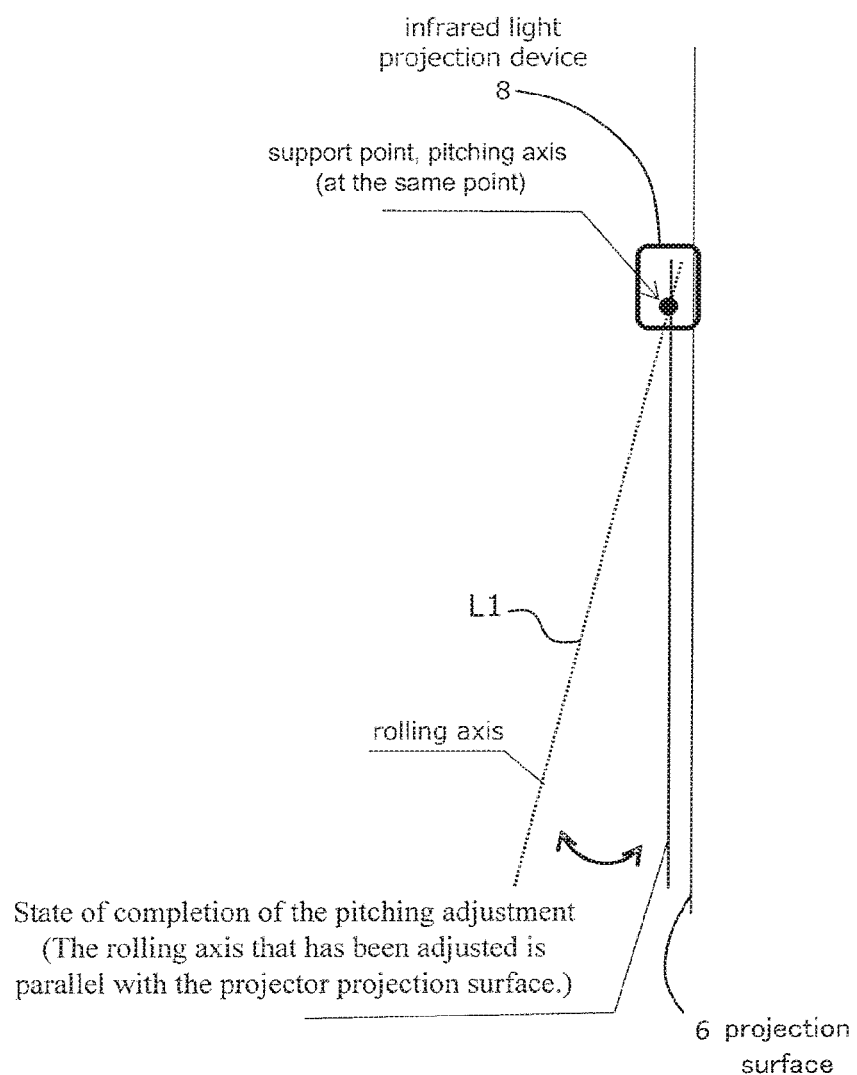
FIG. 18 is a view for describing the movement of rolling axis R that accords with the rotation of dial 10$b$.

FIG. 18 is a view for describing the movement of rolling axis R that accords with the rotation of dial 10b. At the stage in which the pitching direction adjustment has been completed, rolling axis R is in a state of being parallel to projection surface 6 (refer to FIG. 18).

When the pitching direction adjustment has been completed (Step S202), the rolling direction adjustment begins (Step S203).

Because the pitching direction adjustment has been completed, rolling axis R is in a state of being parallel to projection surface 6. In Step S203, pitching axis P is also made parallel to projection surface 6 by rotating pitching axis P with rolling axis R as the axis of rotation.

In Step S203, control unit 91 supplies a picture signal for rolling direction adjustment from picture signal output unit 93 to projector 7. The picture signal for rolling direction adjustment indicates a rolling adjustment image for performing the rolling direction adjustment.

Figure 19:
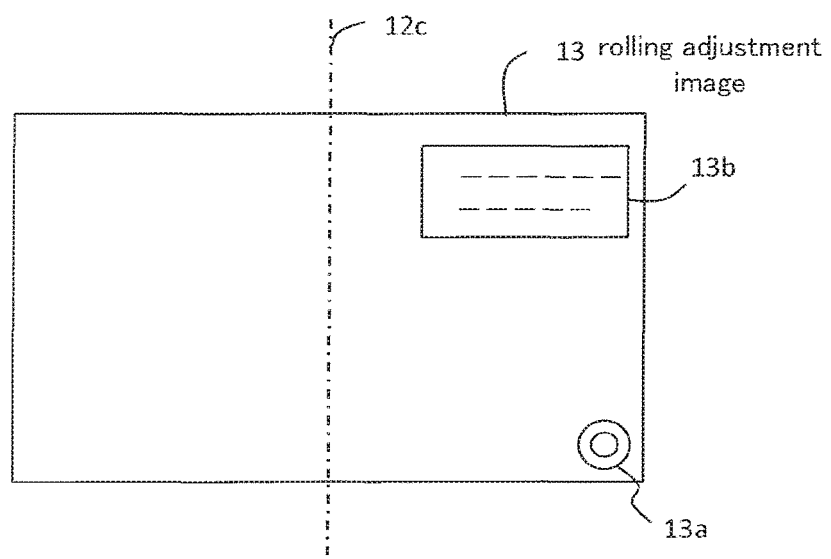
FIG. 19 shows an example of rolling adjustment image 13.

FIG. 19 shows an example of rolling adjustment image 13.

Rolling adjustment image 13 has target 13a that is an example of the second target and instruction 13b.

Target 13a is located in the lower right corner (the lower left corner is also possible) of rolling adjustment image 13. As a result, target 13a is located in the vicinity of, of the sides that demarcate rolling adjustment image 13 that is an example of a displayed image, a side that is parallel to centerline 12c of rolling adjustment image 13 or that is in the vicinity of the end of a parallel side. Again, target 13a is located in the vicinity of the end of, of the sides that demarcate rolling adjustment image 13, a side that is parallel to centerline 12c. Further, target 13a is located in the vicinity of the end that is opposite to the side infrared light projection device 8 of, of the sides that demarcate rolling adjustment image 13, a side that is parallel to centerline 12c. Centerline 12c of rolling adjustment image 13 is an example of the line that is perpendicular to the upper edge or lower edge of rolling adjustment image 13 that is an example of displayed image 4. In the present exemplary embodiment, centerline 12c of rolling adjustment image 13 passes through the center of rolling adjustment image 13.

Instruction 13b indicates "Touch target 13a with an indicator 5 such as a finger."

Upon receiving the picture signal for rolling direction adjustment, projector 7 displays rolling adjustment image 13 on projection surface 6 as displayed image 4.

The user places indicator 5 such as his or her finger in contact with target 13a in accordance with instruction 13b that is shown in rolling adjustment image 13.

Figure 20:
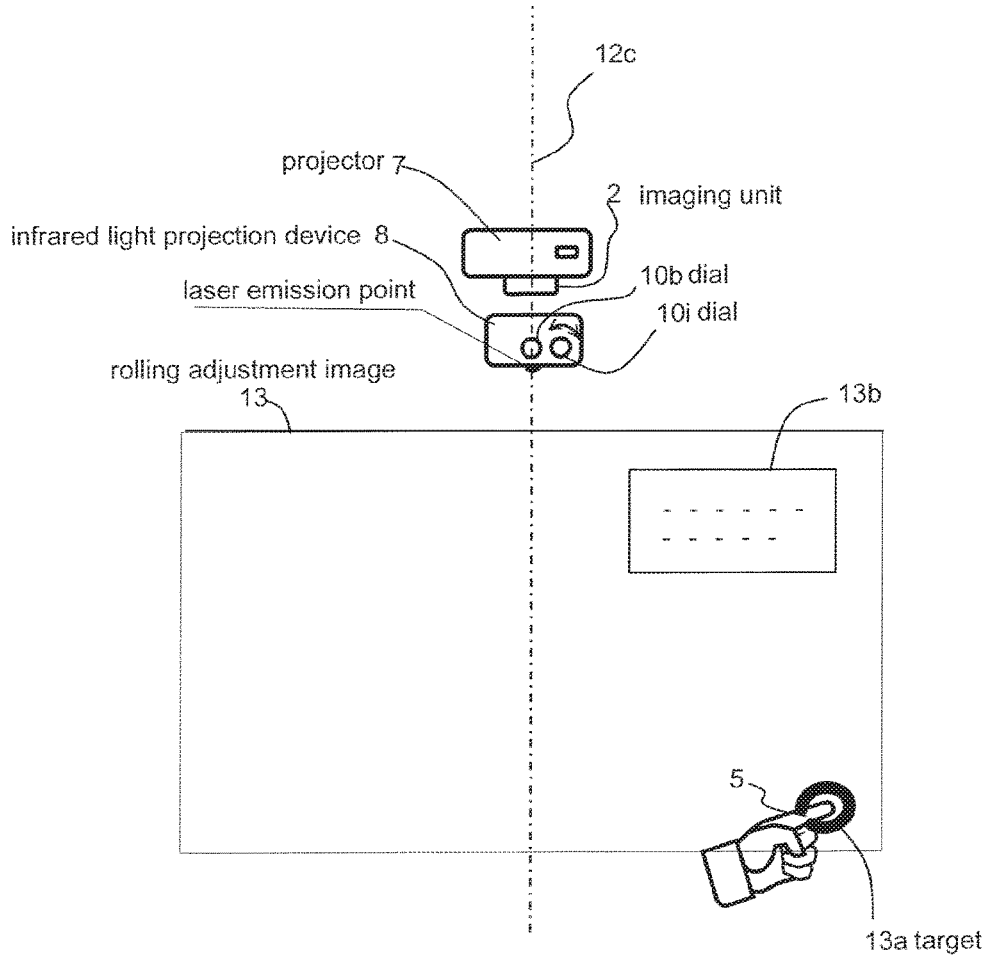
FIG. 20 shows an example of the state in which target 13$a$ is touched by indicator 5 such as a finger.

FIG. 20 shows an example of the state in which indicator 5, such as a finger, is touching target 13a.

When indicator 5 such as a finger is in contact with target 13a, infrared light L1 is emitted and diffused upon indicator 5.

Imaging unit 2 captures an image of the state in which target 13a is in contact with indicator 5, such as a finger, and generates captured image 2a. In other words, imaging unit 2 captures an image of the infrared light that is diffused. Imaging unit 2 then supplies captured image 2a to control unit 91.

Control unit 91 determines irradiation location 5a on displayed image 4 that is shown in captured image 2a as the position of indicator 5 on displayed image 4.

Control unit 91 next displays on display unit 92 the relation between the position of indicator 5 on displayed image 4 and the position of target 13a on rolling adjustment image 13 (displayed image 4) that is specified from the picture signal for rolling direction adjustment.

For example, control unit 91 displays on display unit 92 the coordinates of the position of indicator 5 on displayed image 4 (the detected coordinates) and the coordinates of the position of target 13a on rolling adjustment image 13 (hereinbelow referred to as the "second target coordinates").

When the detected coordinates coincide with the second target coordinates, control unit 91 displays on display unit 92 second information (for example, the information that "The detected coordinates have coincided with target 13a") that shows matching of the coordinates. The display of the second information means that the rolling direction adjustment has been completed.

Until the second information is displayed, the user continues to touch target 13a with his or her finger and manipulates dial 10i while watching the detected coordinates and the second target coordinates that are displayed on display unit 92 to adjust the direction of infrared light L1 and thus cause the detected coordinates to coincide with the second target coordinates. When the detected coordinates match with the second target coordinates, control unit 91 displays on display unit 92 the second information (for example, the information that "The detected coordinates have coincided with target 13a"), and the rolling direction adjustment is completed.

Figure 21:
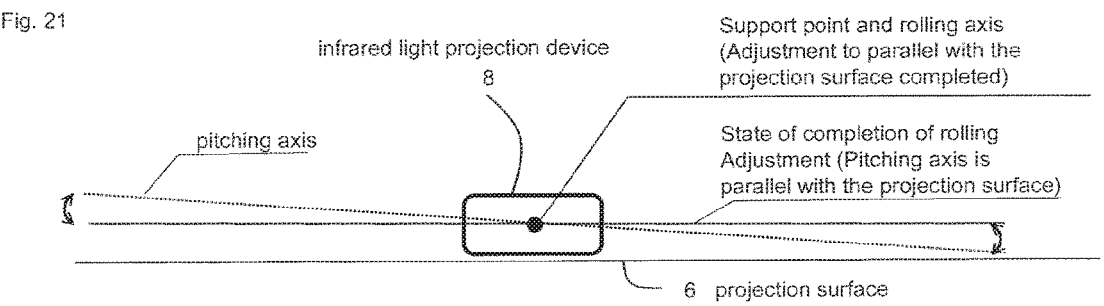
FIG. 21 is a view for describing the movement of pitching axis P that accords with the rotation of dial 10$i$.

FIG. 21 is a view for describing the movement of pitching axis P that accords with the rotation of dial 10i.

At the stage in which the rolling direction adjustment has been completed, the pitching axis P is also in a state of being parallel to projection surface 6 (see FIG. 21). As a result, the plane in which progression region L2 is formed is parallel to projection surface 6.

When the rolling direction adjustment has been completed (Step S204), control unit 92 completes the adjustment of the orientation of projection unit 1 (the adjustment of the orientation of the plane in which progression region L2 is formed).

As shown in the present exemplary embodiment, when rolling axis R overlies centerline 4*a* of displayed image 4, infrared light projection device 8 can be set in a state in which there is no limitation upon the distance (h) from the upper edge of displayed image 4 to infrared light projection device 8. As a result, infrared light projection device 8 may be installed in a position that approaches the very upper edge of displayed image 4. Alternatively, infrared light projection device 8 may be installed at a distance from the upper edge of displayed image 4. This feature therefore increases the degree of freedom regarding screens that can be used.

Target 13*a* for the pitching direction adjustment may be at any position on centerline 12*c* without raising a problem. However, the implementation of adjustment by using target 12*a* that is at a more remote location from the infrared light emission point of infrared light projection device 8 enables increased in accuracy. As a result, in the present exemplary embodiment, target 13*a* is set in the vicinity of the lower edge of displayed image 4.

As with the rolling direction adjustment, the presence of target 13*a* at a point close to the corner of displayed image 4 enables adjustment of the angle of the surface with greater accuracy than when target 13*a* is at a point close to centerline 12*c*. As a result, target 13*a* is set in the vicinity of a lower corner of displayed image 4 in the present exemplary embodiment.

The action and effect of the present exemplary embodiment are next described.

In the present exemplary embodiment, adjustment support point 10*a*1 and adjustment axis (rolling axis) R are on the centerline of displayed image 4 and infrared light projection device 8, and the other adjustment axis (pitching axis) P is arranged so as to pass through the same adjustment support point 10*a*1 and be orthogonal to rolling axis R.

In this state, dial 10*b* and dial 10*i* are manipulated (adjusted) in that order to adjust the angle of the plane in which infrared light L1 is formed. Dial 10*b* corresponds to the pitching direction adjustment, and the angle of rolling axis R is adjusted with pitching axis P as the axis of rotation in accordance with the manipulation of dial 10*b*. Dial 10*i* corresponds to the rolling direction adjustment, and the angle of pitching axis P is adjusted with rolling axis R as the axis of rotation in accordance with the manipulation of dial 10*i*.

As a result, adjustment for setting the plane that contains the progression region of infrared light parallel to a displayed image can be easily accomplished.

The reason for manipulating dial 10*b* before dial 10*i* is next explained.

If adjustment of the pitching direction is completed first, the wall (the screen surface) and rolling axis R are set in parallel. The adjustment of the rolling direction is next implemented, but the adjustment of the right-left rotation direction is implemented with the rolling axis that has been set parallel to the wall (the screen surface) as center. As a result, the plane of infrared light L1 that is parallel to the wall (the screen surface) can be set by manipulating as few as two steps.

To complete adjustment in two steps, manipulation must be implemented in the order of dial 10*b* and dial 10*i* as described here.

In the present exemplary embodiment, display unit 92 displays the relation between the position of the target on displayed image 4 and the position of indicator 5 on displayed image 4 that was determined by control unit 91.

As a result, by viewing the display on display unit 92, the user is able to check the difference between two positions (the position of the target on displayed image 4 and the position of indicator 5 on displayed image 4 that was determined by control unit 91) that are actually the same position. This difference arises due to the inclination of the plane on which progression region L2 is formed with respect to projection surface 6. As a result, by viewing the display on display unit 92, the user is able to adjust the orientation of projection unit 1 such that the orientation of projection unit 1 becomes the appropriate orientation.

Infrared light projection device 8 includes manipulation unit 10*x* and adjustment unit 10*y* that changes the orientation of projection unit 1 in accordance with the manipulation of manipulation unit 10*x*.

As a result, the user is able to adjust the orientation of projection unit 1 such that the orientation of projection unit 1 is appropriate by manipulating manipulation unit 10*x* while viewing the display on display unit 92.

In the present exemplary embodiment, the pitching direction adjustment and the rolling direction adjustment are carried out by adjusting dial 10*b* and dial 10*i*. As a result, the orientation of projection unit 1 can be easily adjusted by the rotation of projection unit 1 around each of two different axes of mutually different directions.

Modifications are next described.

In the above-described exemplary embodiment, a projection unit that has a plurality of laser light sources 1*a* and a plurality of cylindrical lenses 1*b* was used as projection unit 1, but projection unit 1 need not include a plurality of cylindrical lenses 1*b*. In this case, a plurality of laser light sources 1*a* may be arranged such that adjacent laser light sources 1*a* are in contact. Alternatively, rather than using a plurality of laser light sources, infrared light may be projected in fan form by spreading the light supplied from a single laser light source by a prism.

Displayed image 4 is not limited to an image that is projected by a projector and may be an image displayed by a display device such as an LCD (Liquid Crystal Display). In this case, the position of indicator 5 that points to displayed image 4 can be detected even if, for example, a display device is used that lacks a touch panel.

In the exemplary embodiment described hereinabove, the configurations shown in the drawings are merely examples, and the present invention is not limited to these configurations.

Although the invention of the present application has been described with reference to an exemplary embodiment, the invention of the present application is not limited to the above-described exemplary embodiment. The configuration and details of the invention of the present application are open to various modifications within the scope of the invention of the present application that will be clear to one of ordinary skill in the art.

EXPLANATION OF REFERENCE NUMBERS

100 position detection system
1 projection unit
1*a* laser light source
1*b* cylindrical lens
2 imaging unit
4 displayed image
5 indicator
6 projection surface 7 projector
8 infrared light projection device
9 control device
10x manipulation unit
10y adjustment unit
10a substrate
10a1 support point
10a2, 10a3 adjustment point
10b, 10i dial
10c, 10d, 10j, 10k toothed wheel
10e, 10m shaft
10f, 10n, 10p support unit
10g, 10h projection unit
10q guide unit
10q1 guide groove
L1 infrared light
L2 progression region
P pitching axis
R rolling axis

What is claimed is:

1. An infrared light adjustment method for adjusting a direction of infrared light that is projected so that the infrared light passes over a displayed image from a rotatable projection device that is rotatable with each of a first axis and a second axis that is orthogonal to the first axis as axes of rotation, the method comprising:
arranging said projection device such that a plane that contains said first axis and a line that is perpendicular to an upper edge or a lower edge of said displayed image is orthogonal to a surface on which said displayed image is displayed;
displaying a first image that represents a first target on said line as said displayed image;
rotating said projection device with said second axis as the axis of rotation such that a position of irradiation of said infrared light upon an indicator in said displayed image, in which is represented a captured image that captures a state of said indicator that points to said first target being irradiated by said infrared light, coincides with a position of said first target in said displayed image;
displaying, as said displayed image in place of said first image, a second image that represents a second target at a location that is different from said line; and
rotating said projection device with said first axis as the axis of rotation such that the irradiation position of said infrared light upon said indicator in said displayed image, in which is represented a captured image that captures a state of an indicator that points to said second target being irradiated by said infrared light, coincides with a position of said second target in said displayed image.

2. The infrared light adjustment method as set forth in claim 1, wherein said line passes through a center of said displayed image.

3. The infrared light adjustment method as set forth in claim 1, wherein said first target is located on said line in a vicinity of a side opposite to said projection device.

4. The infrared light adjustment method as set forth in claim 1, wherein said second target is located in a vicinity of, from among sides that demarcate said display image, a side that is parallel to said line.

5. The infrared light adjustment method as set forth in claim 4, wherein said second target is located in a vicinity of an end of, from among sides that prescribe said displayed image, a side that is parallel to said line.

6. The infrared light adjustment method as set forth in claim 5, wherein said second target is located in a vicinity of an end that is opposite to said projection device-side of, from among sides that prescribe said displayed image, a side that is parallel to said line.

7. The infrared light adjustment method as set forth in claim 1, wherein displayed is a relation between said irradiation position in said displayed image, in which is displayed a state where an indicator pointing to said first target and irradiated by said infrared light has been captured in a captured image, and the position of said first target in said displayed image.

8. The infrared light adjustment method as set forth in claim 1, wherein displayed is a relation between said irradiation position in said displayed image, in which is displayed a state where an indicator pointing to said second target and irradiated by said infrared light has been captured in a captured image, and the position of said second target in said displayed image.

9. The infrared light adjustment method as set forth in claim 1, wherein said rotatable projection device comprises:
a first substrate serving as a support platform having a pivot; and
a second substrate supported on said first substrate by said pivot, said second substrate having mounted thereon at least one infrared light source for emitting infrared light in a fan-shaped beam,
wherein a first adjustment knob mounted on said first substrate controls a rotation of a first male threaded shaft and a second adjustment knob mounted on said first substrate controls a rotation of a second male threaded shaft,
wherein a rotation of the first adjustment knob in a first direction causes a tip of said first male threaded shaft to advance in position and a rotation in a second direction opposite said first direction causes the tip of said first male threaded shaft to recede in position,
wherein a rotation of the second adjustment knob in the first direction causes a tip of said second male threaded shaft to advance in position and a rotation in a second direction opposite said first direction causes the tip of said second male threaded shaft to recede in position, and
wherein an advancing and receding of the tip of said first male threaded shaft causes said second substrate to rotate about said pivot in said first rotation axis and an advancing and receding of the tip of said second male threaded shaft causes the second substrate to rotate about said pivot in said second rotation axis.

10. A position detection system, comprising:
a display device that displays an image on a display screen;
a projection device that is rotatable with each of a first axis and a second axis that is orthogonal to the first axis as axes of rotation, that is arranged such that a plane that contains said first axis and a line that is perpendicular to an upper edge or a lower edge of said display screen is orthogonal to said display screen, and moreover, that projects infrared light so that said infrared light passes over said display screen;
an imaging unit that captures an image of a state in which infrared light is irradiated upon an indicator that points to a portion of said display screen to generate a captured image; and a control unit that controls a display operation of said display device and that determines a position of said indicator on said display screen on a basis of said captured image, wherein said control unit displays, on said display screen, a first image that represents a first target on an intersection line between said display screen and said plane to determine whether or not a position of irradiation of said infrared light upon said indicator, which is represented by a captured image that captures a state in which said infrared light is irradiated to said indicator that points to said first target, coincides with a position of said first target, wherein, if the position of irradiation of said infrared light upon said indicator coincides with the position of said first target, said control unit displays, on said display screen in place of said first image, a second image that represents a second target at a location that is different from said intersection line to determine whether or not the position of irradiation of said infrared light upon said indicator, which is represented by a captured image that captures a state in which said infrared light irradiated to said indicator that points to said second target, coincides with a position of said second target.

11. The position detection system as set forth in claim 10, wherein said rotatable projection device comprises:

a first substrate serving as a support platform having a pivot; and a second substrate supported on said first substrate by said pivot, said second substrate having mounted thereon at least one infrared light source for emitting infrared light in a fan-shaped beam, wherein a first adjustment knob mounted on said first substrate controls a rotation of a first male threaded shaft and a second adjustment knob mounted on said first substrate controls a rotation of a second male threaded shaft, wherein a rotation of the first adjustment knob in a first direction causes a tip of said first male threaded shaft to advance in position and a rotation in a second direction opposite said first direction causes said tip of said first male threaded shaft to recede in position, wherein a rotation of the second adjustment knob in the first direction causes a tip of said second male threaded shaft to advance in position and a rotation in the second direction opposite said first direction causes said second male threaded shaft to recede in position, and wherein an advancing and receding of said tip of said first male threaded shaft causes said second substrate to rotate about said pivot in said first rotation axis and an advancing and receding of said tip of said second male threaded shaft causes said second substrate to rotate about said pivot in said second rotation axis.

12. An infrared light projection device, comprising:

a first substrate serving as a support platform having a pivot; and a second substrate supported on said first substrate by said pivot, said second substrate having mounted thereon at least one infrared light source for emitting a fan-shaped beam of infrared light, wherein a first adjustment knob mounted on said first substrate controls a rotation of a first male threaded shaft and a second adjustment knob mounted on said first substrate controls a rotation of a second male threaded shaft, wherein a rotation of the first adjustment knob in a first direction causes a tip of said first male threaded shaft to advance in position and a rotation in a second direction opposite said first direction causes the tip of said first male threaded shaft to recede in position, wherein a rotation of the second adjustment knob in the first direction causes a tip of said second male threaded shaft to advance in position and a rotation in the second direction opposite said first direction causes the tip of said second male threaded shaft to recede in position, wherein an advancing and receding of the tip of said first male threaded shaft causes said second substrate to rotate about said pivot in a first rotation axis and an advancing and receding of the tip of said second male threaded shaft causes said second substrate to rotate about said pivot in a second rotation axis, and wherein a position of said second substrate in said first axis and said second axis permits an orientation calibration of said fan-shaped beam of infrared light relative to a display screen, by using targets displayed on the display screen.

13. The infrared light projection device as set forth in claim 12, wherein said first rotation axis correlates to a pitch axis of said fan-shaped beam of infrared light and said second rotation axis correlates to a roll axis of said fan-shaped beam of infrared light.

14. The infrared light projection device as set forth in claim 13, wherein said fan-shaped beam of infrared light is oriented in said pitch axis using a target displayed in a center bottom position on said display screen and is oriented in said roll axis using a target displayed in a lower corner of said display screen.

15. The infrared light projection device as set forth in claim 14, wherein said fan-shaped beam of infrared light is oriented by detecting, for each of said pitch axis and said roll axis, a relation between an irradiation position in an image displayed on said display screen, in which is displayed a state where an indicator pointing to a target and irradiated by said infrared light has been captured in a captured image, and a position of the target in said displayed image.

* * * * *